United States Patent

[11] 3,550,755

| [72] | Inventor | Tore H. Noren |
| | | 1350 Donner Ave., San Francisco, Calif. 94124 |
| [21] | Appl. No. | 730,019 |
| [22] | Filed | May 17, 1968 |
| [45] | Patented | Dec. 29, 1970 |

[54] ENDLESS CONVEYOR FOR A DISHWASHER WITH LINKS INTERCONNECTING ADJACENT DOLLIES
3 Claims, 13 Drawing Figs.

| [52] | U.S. Cl. | 198/181 |
| [51] | Int. Cl. | B65g 15/00 |
| [50] | Field of Search | 198/177, 181, 131; 281/60, 62 |

[56] References Cited
UNITED STATES PATENTS

| 1,632,480 | 6/1927 | Hunt | 287/60 |
| 1,879,636 | 9/1932 | Cole | 287/60 |
| 2,933,178 | 4/1960 | Hammond | 198/177 |
| 3,117,668 | 1/1964 | Weihe | 198/181 |

*Primary Examiner*—Richard E. Aegerter
*Attorney*—William R. Piper

ABSTRACT: An endless conveyor for a dishwasher including a table having an endless track for supporting an endless train of dollies which in turn support dish-containing baskets, the dollies being interconnected by links. The train of dollies is intermittently moved so that only one dolly at a time with its basket is brought before an operator who places the soiled dishes in the basket. The dollies carry the dishes through the dishwasher where they are washed and sterilized after which the clean dishes can be removed from the baskets. Certain dollies carry track wipers of novel construction.

PATENTED DEC 29 1970

INVENTOR.
TORE H. NOREN
BY
William R. Piper
ATTORNEY

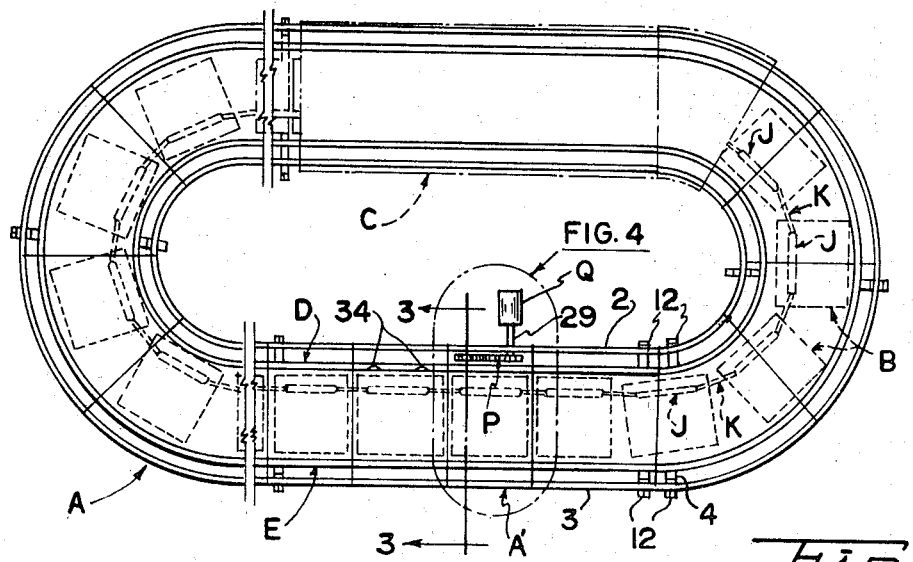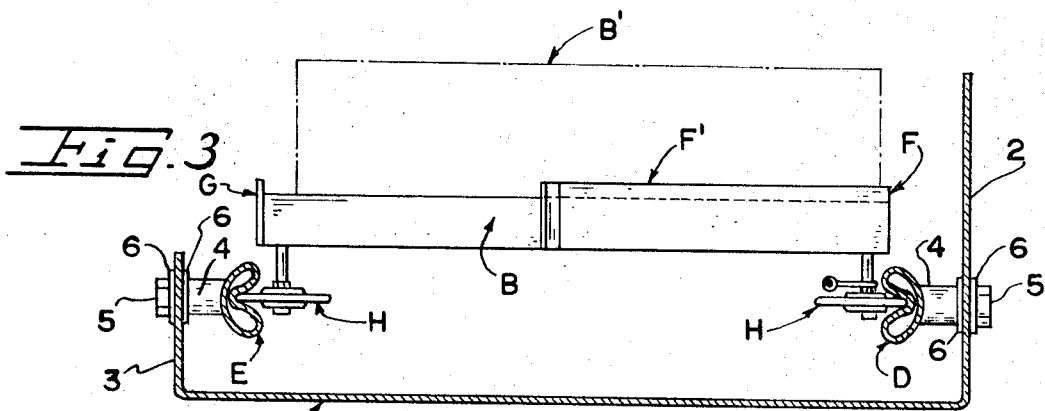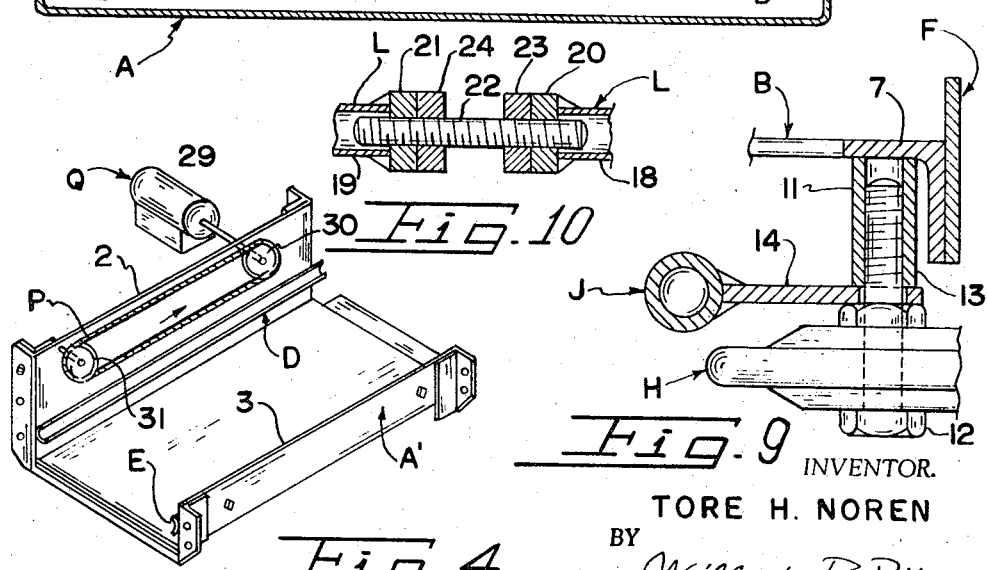

INVENTOR.
TORE H. NOREN
BY William R. Piper
ATTORNEY

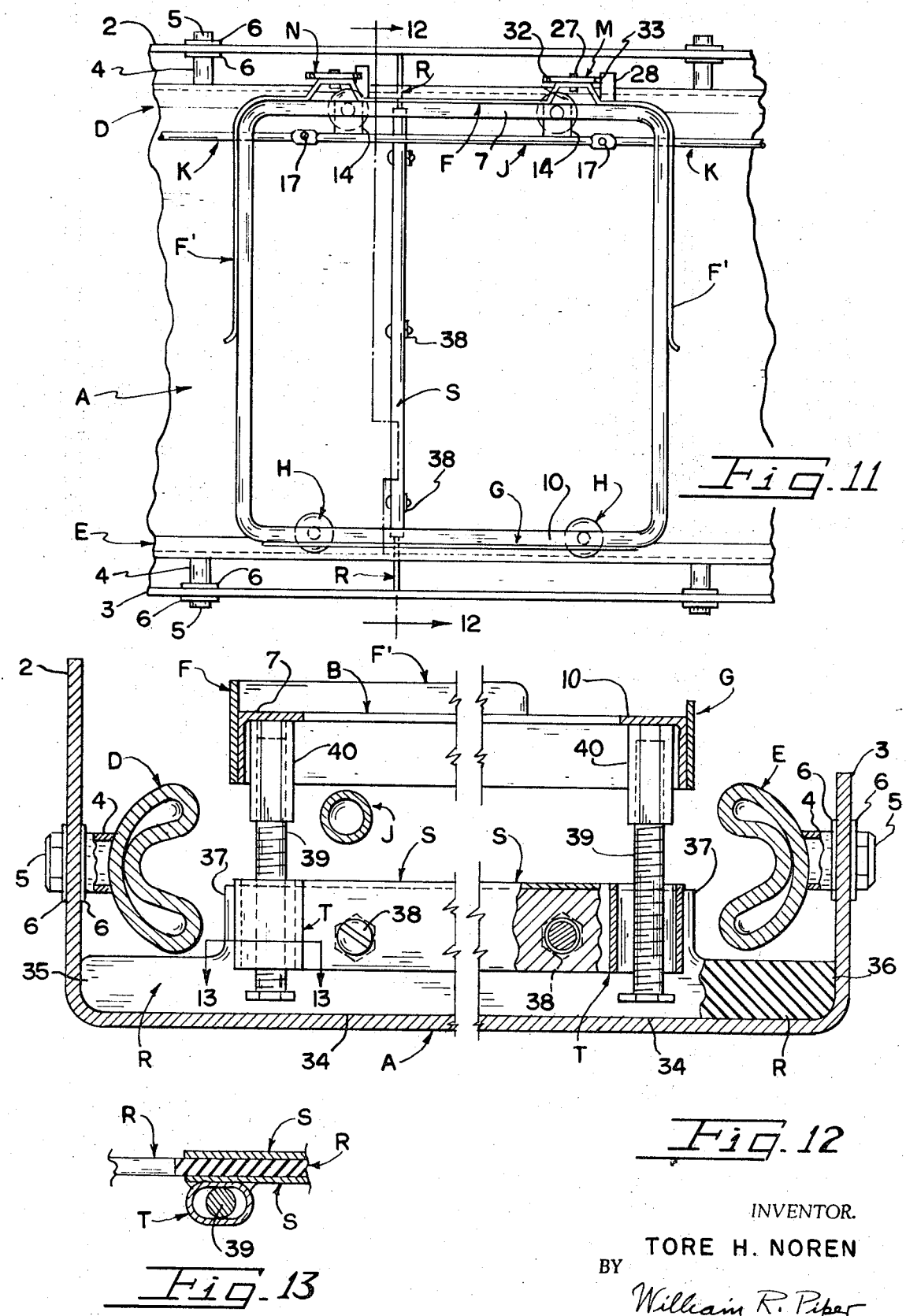

ENDLESS CONVEYOR FOR A DISHWASHER WITH LINKS INTERCONNECTING ADJACENT DOLLIES

CROSS-REFERENCES TO RELATED APPLICATIONS

The oval-shaped table used in the present device is made up of sections that are connected together by waterproof joints of the type shown in my copending patent application on a Sectional Oval-Shaped Table for Endless Conveyor for Dishwasher, Ser. No. 632,093 filed Apr. 19, 1967, now U.S. Pat. No. 3,447,491. The table sections can be readily moved through doorways and then the table of a desired size can be assembled by connecting the sections together to provide an endless oval-shaped track for the dish-carrying dollies. The joints between the sections can be made waterproof without the need of welding the sections together.

In another copending application on a Dolly Conveyor for a Dishwasher, Ser. No. 707,565, filed Feb. 23, 1968, I disclose an endless train of basket-carrying dollies that travel on a track that is mounted on the oval table. The dollies or carriers are provided with resilient bumpers and the bumpers of adjacent dollies abut one another. Novel means is used for successively moving one dolly at a time and this will cause the entire train of dollies to move. A dishwashing machine is associated with the oval table and the baskets on the dollies or carriers will convey the soiled dishes through the dishwasher where they will be washed and rinsed and sterilized.

BACKGROUND OF THE INVENTION

1. Field of the Invention

One type of commercial dishwasher makes use of an oval table with an endless track for supporting and guiding a train of dollies into and out from a dishwashing machine. The dollies or carries are interconnected by links. Dish-receiving baskets are mounted on the dollies.

2. Description of the Prior Art

The U.S. Pat. to Clyde R. Weihe et al. No. 3,117,668, issued Jan. 14, 1964, is for a conveyor for dishwasher where an oval table is disclosed as having an endless track on which dollies or carriers are mounted. Links interconnect the carriers and an endless chain is used for successively engaging one carrier at a time for moving the endless train of carriers around the oval table.

SUMMARY OF THE INVENTION

An object of my invention is to provide an endless conveyor for a dishwasher in which links interconnect the dollies so as to provide a continuous train of dish-carrying dollies that travels over the oval table. Each dolly has a link secured thereto whose length extends in the direction of travel of the dolly. Intermediate links pivotally connect adjacent dollies together and one of the intermediate links is adjustable in regards to its effective length and in this way the overall length of the endless train of dollies can be adjusted to conform to the overall length of the oval table.

Every fourth dolly carries a squeegee and novel means is used for connecting the squeegee to the dolly so that it will extend transversely across the table top from one side wall to the opposite side wall. The dolly will drag the squeegee over the table top surface to remove foreign matter therefrom and the squeegee can move vertically in its supporting means and also adjust laterally so as to conform to any irregularities of the table top surface.

BRIEF DESCRIPTION OF THE DRAWINGS

FIG. 2 is a top plan view of the oval table on a smaller scale than shown in FIG. 1. The endless train of dollies is indicated by dot-dash lines and links interconnect adjacent dollies.

FIG. 3 is an enlarged transverse section taken through the oval table as indicated by the section lines 3–3 in FIG. 2. The guide and supporting rails for the dollies are shown in section and one of the dollies has its supporting wheels riding in the opposed parallel rails. A dish-carryig basket, indicated by dot-dash lines is mounted on the dolly.

FIG. 4 is an isometric view of the dolly drive section and is an enlargement of the oval dot-dash area indicated "FIG. 4," in FIG. 2.

FIG. 9 is an enlarged transverse section taken along the line 9–9 of FIG. 6 and illustrates how the link is supported by the dolly.

FIG. 10 is an enlarged longitudinal section taken along the line 10–10 of FIG. 5 to illustrate a portion of the adjustable intermediate link that interconnects the links carried by two adjacent dollies.

FIG. 11 is a top plan view of one of the dollies that carries the table top wiping squeegee. The squeegee is shown extending transversely across the table top from one side wall to the opposite side wall.

FIG. 12 is an enlarged transverse section taken along the line 12–12 of FIG. 11 and illustrates the means for connecting the squeegee to the dolly and permitting the squeegee to have a limited vertical and lateral movement with respect to the dolly so that it can conform to any irregularities of the table to surface.

FIG. 13 is a horizontal section through a portion of the squeegee mounting means and is taken along the line 13–13 of FIG. 12.

DESCRIPTION OF THE PREFERRED EMBODIMENT

Figure 1:
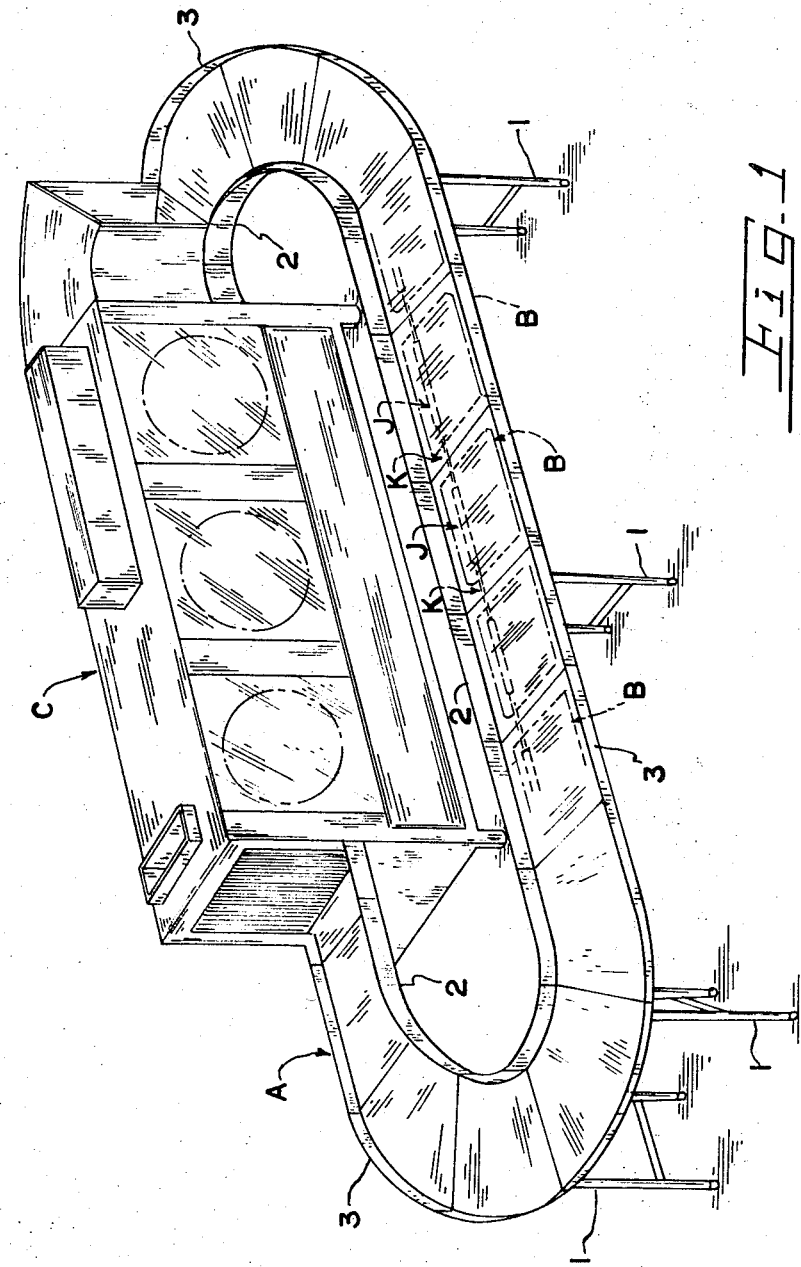
FIG. 1 is a perspective view of an oval table composed of interconnected sections and a portion of the dish-carrying train of dollies is shown by dot-dash lines. The dolly train conveys the dishes through the dishwashing machine where the dishes are washed and sterilized.

In carrying out my invention I provide an oval table top indicated generally at A, and this is formed from sections that are interconnected to make a watertight joint as clearly described in my copending application, Ser. No. 632,093. The oval table is supported by legs 1, see FIG. 1. The table supports a train of interconnected dish-carrying dollies, a few of these being indicated by dot-dash lines at B, and the dollies carry the dishes through a dishwasher indicated generally at C, where the dishes are washed and sterilized.

FIG. 2 illustrates a top plan view of the oval table A, and shows how the dish-carrying dollies B, are supported and guided by an endless pair of rails indicated generally at D and E. A detailed description of these rails has been set forth in my copending application Ser. No. 707,565. The oval table is provided with a higher inner wall 2, see FIG. 3, and a lower outer wall 3. The inner wall 2 of the table supports the inner endless rail D, by a plurality of spaced apart internally threaded sleeves 4 that are welded at one of their ends to the back of the rail D, so that the sleeve axis extends at right angles to the longitudinal axis of the rail. Bolts 5 have their shanks extending through openings in the inner wall 2 of the table and the threaded portions of the shanks are received in the threaded bores of the sleeves. Washers 6 are used for spacing the inner rail D, the desired distance from the adjacent wall 2. The outer endless rail E is secured in spaced relation from the outer wall 3 of the table by similar sleeves and bolts and like reference numerals will be given to similar parts. The inner and outer endless rails D and E are tubular in cross section, see FIGS. 3 and 12 with the inner sides of the rails being curved inwardly for forming longitudinally extending grooves that will receive and support wheels which in turn will carry the dollies B.

Figure 5:
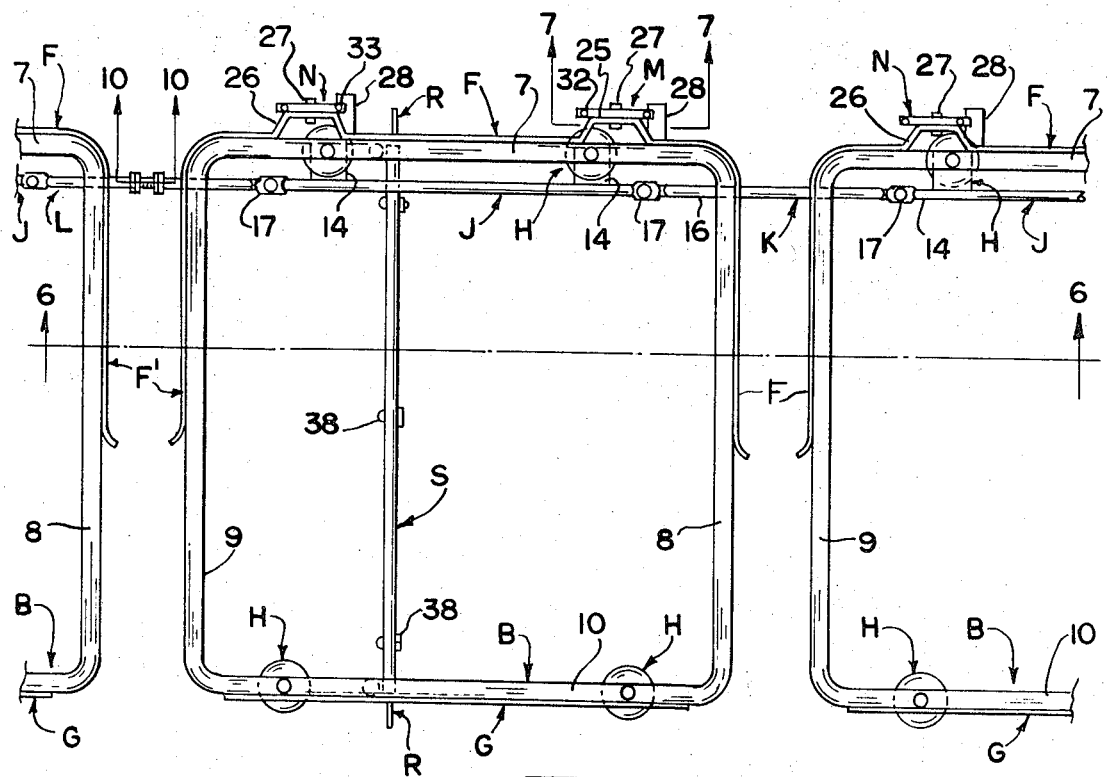
FIG. 5 is an enlarged plan view of one of the dollies and illustrates portions of the adjacent dollies and how the dollies are interconnected by links, one of the links being adjustable to alter its effective length.
Figure 6:
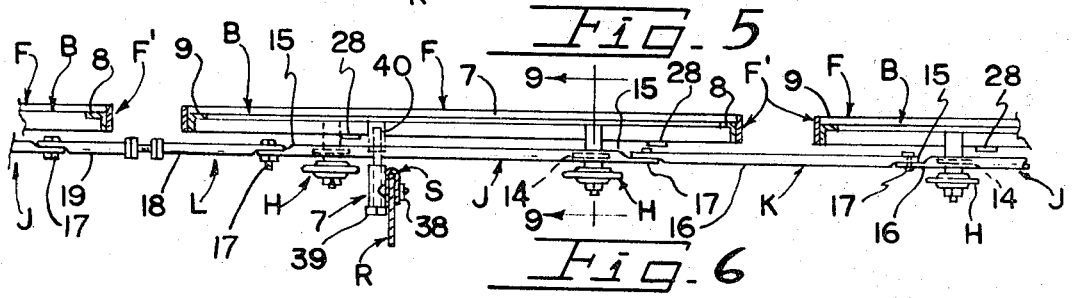
FIG. 6 is a section taken along the line 6–6 of FIG. 5 and illustrates the linkage connection between adjacent dollies.

A top plan view of one of the dish-carrying dollies B, is illustrated in FIG. 5, and a section is shown in FIG. 6. The dolly has a substantially square stainless steel frame made from angle iron and the frame has rounded corners. The frame will support a standard dish-carrying basket indicated in side elevation by the dot-dash lines in FIG. 3 at B'. A guard and basket-positioning strip F extends along the rear portion 7 of the dolly frame B, and the end portions F' of the rail extend along the sides 8 and 9 of the frame. FIG. 6 illustrates how the upper edge of the basket retaining strip projects above the top of the dolly frame B. The front portion 10 of the dolly frame B, has a basket retaining strip projects above the top of the dolly G, and this strip cooperates with the strip F to position the dish-retaining basket B', in the proper place on the dolly B.

Each dolly B, is supported by four wheels H, two being carried by the rear frame portion 7, see FIG. 5, riding in the rail D and two being carried by the front frame portion 10 and rising in the rail E, see also FIG. 3. My copending patent application, Ser. No. 707,565, illustrates the particular construction of the dolly-supporting wheel. The two wheels H, disposed on the rear portion 7 of the dolly B, are disposed closer together than the two wheels H on the front portion 10 to permit the dolly to travel around the arcuate portions of the two tracks D and E that are of different radii. FIG. 9 is an enlarged sectional view of the mounting for one of the wheels H that is carried by the rear portion 7 of the dolly frame B. An internally threaded sleeve 11 has its upper end welded to the rear portion 7 and the wheel-supporting bolt 12 has its threaded shank 13 received in the threaded bore of the sleeve. The wheel H, has a ball-bearing race, not shown, that permits the wheel to freely rotate about the vertical axis of the bolt 12.

The two bolts 12 that secure the wheels H to the rear portion 7 of the dolly frame B (see FIG. 9, that illustrates one of the wheels) also support link-carrying arms 14 that are welded to links J. Each dolly B, carries one link J, and the latter extends in the direction of travel of the dolly along the parallel rails D and E. The link J is tubular and both of its ends 15 are flattened and are provided with bolt-receiving openings for receiving bolts 17 or headed pins that can readily be removed. Intermediate links K of a predetermined length have flattened ends 16 that overlie the flattened ends of the dolly-supported links J. in this way the intermediate links K are supported by the ends of the dolly-supported links and headed pins or bolts 17 can act as the pivotal connection between adjacent links. The pivot bolts 17 are placed close to the axes of the wheels H that support the rear portions 7 of the dolly frames B. This will prevent any jambing of the interconnected links as the dollies move around the arcuate portions of the endless tracks D and E. If headed pins 17 are used instead of bolts, then gravity is relied upon to keep the pins in place. They can be more readily removed than the bolts but either can be used as pivotal connections between links.

FIG. 2 illustrates how the intermediate links K interconnect the adjacent dollies B, to form an endless train of dollies that will extend throughout the entire circuit of the oval path made by the endless inner and outer dolly guide and supporting rails D, and E. It is necessary that one of the intermediate links be made adjustable as to its effective length in order to overcome any slight discrepency between the length of the train of dollies B, and the length of the oval track formed by the rails D and E. In FIGS. 5, 6 and 10, I show an adjustable intermediate link L that will interconnect two of the adjacent dollies. This link is divided into two tubular sections 18 and 19, each having a flattened outer end adapted to rest on the flattened ends of adjacent links J and be pivotally connected thereto by the bolts 17. The adjacent ends of the sections 18 and 19 have nuts 20 and 21, respectively, welded thereto so that the axes of the nuts coincide with the axes of the sections, note the sectional view in FIG. 10. A threaded connector 22 has its ends screwed into the nuts 20 and 21 for altering the overall length of the adjustable link L. Lock nuts 23 and 24 are mounted on the connector 22 and when the link L has been adjusted to have the proper effective length, the lock nut 23 can be tightened against the section nut 20 and the lock nut 24 can be tightened against the section nut 21 for securing and holding the sections 18 and 19 in their adjusted position.

The means for moving the train of dollies along the oval track is the same as that disclosed in my copending application, Ser. No. 707,565. Each dolly B, is provided with a pair of pawls M AND N, see FIG. 5, and since both are identical, a description of the pawl M will suffice for both. The basket-positioning strip F is bent to form two offset portions 25 and 26 and the pawls M and N are swingably supported on these offsets by bolts 27, see also FIGS. 7 and 8. The pawl M is so mounted that the right hand end is heavier than the left hand end and therefore the right hand end will rest on a stop 28 that is carried by the dolly or carrier B, see the dot-dash line position of the pawl M in FIG. 7.

Figures 7, 8:
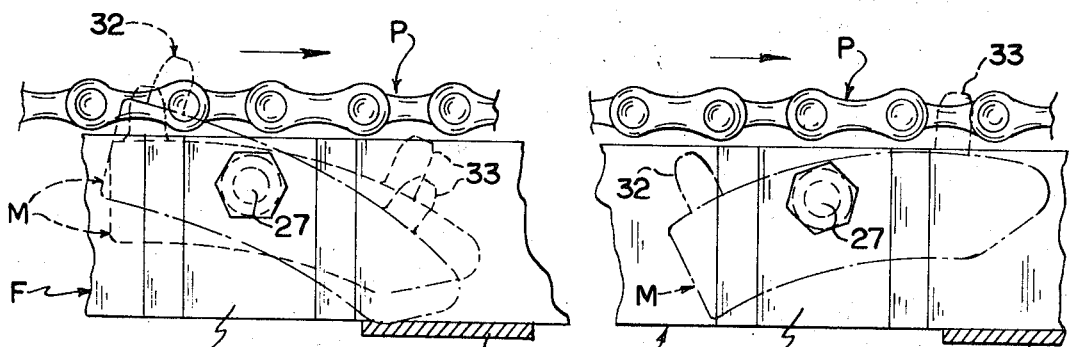
FIG. 7 is an enlarged view of a chain-engaging pawl that is pivotally carried by the dolly and is taken substantially along the line 7–7 of FIG. 5. The pawl is shown in chain-engaging position by dotted lines and the dot-dash lines indicate the position of the pawl when not engaging the endless drive chain.
FIG. 8 indicates the position the pawl will take to engage the chain when any effort is made to move the dish-carrying dolly faster than the speed of the endless chain.

The pawls M and N are designed to successively engage with an endless drive chain P, shown in detail in FIGS. 7 and 8, and shown isometrically and on a smaller scale in FIG. 4. One of the sections A' of the oval table is the drive section for moving the train of dollies B. The inner wall 2 of the table section A' has a drive shaft 29 extending therethrough and a drive sprocket 30 is mounted on the shaft and is disposed near the inner wall. An idler sprocket 31 is spaced from the drive sprocket 30 and the endless chain P is passed around both sprockets. A motor Q or any other power source rotates the drive shaft 29 at the desired speed so that the lower reach of the endless chain will travel to the right in FIGS. 4, 7 and 8.

FIGS. 7 and 8 show the lower reach of the endless chain P as lying above the pawl M. This pawl has a chain-engaging pin 32 that is positioned to the left of the pivot bolt 27 and when the pawl has its right end resting on the stop 28, the left end of the pawl will raise the pin so as to engage with the endless chain P when the dolly or carrier B enters the drive section A' of the oval table. This will swing the pawl M from the dotted line position in FIG. 7 into the dot-dash line position shown in the same FIG. The continuously moving chain P will move the pawl M to the right in FIG. 7 and with it the dolly or carrier B. This will bring the other pawl N into engagement with the chain P and by the time this pawl is freed from the chain, the dolly will have moved off from the drive section A' of the oval table. Since all of the dollies B are interconnected by the links, the next successive dolly with its pawls M and N will have been brought into engagement with the chain P. Therefore the train of dollies B will continuously move so long as the sprocket chain P is moving.

The dishes must be conveyed through the dishwasher at a predetermined slow speed so that the dishes will be effectively washed and sterilized. I provide a locking pin 33 on each pawl M and N and this is placed to the right of the pivotal support 27 for the pawl, see FIGS. 7 and 8. When the drive pin 32 of the pawl M engages with the chain P, the pawl will be swung counterclockwise about its pivot 27 through a small arc and this will raise the locking pin 33 to a position just below the chain P, as shown in FIG. 7. If now the operator tries to manually move the dolly B to the right faster than the speed of the chain P, the drive pin 32 will be forced out of engagement with the drive chain but before this can entirely be accomplished, the swinging of the pawl M counterclockwise to free the drive pin 32 will raise the locking pin 33 into engagement with the chain P, as shown in FIG. 8. This pin 33 will prevent the dolly B being moved any faster than the speed of the chain. In this way the entire train of dollies B can only be moved at the speed set by the drive chain P.

If it is desired to remove a dolly or carrier B from the table A for inspection or repair, the inner endless rail D is provided with a pair of recesses 34-34 in the upper portion of the track, see FIG. 2, and these recesses are spaced the same distance apart as are the two wheels H of the dolly that ride in this rail. The operator can align the two wheels H of the dolly to be removed with the two recesses 34 and then he disconnects the intermediate links K that connect this dolly to the two adjacent dollies. The operator can now lift the rear portion 7 of the freed dolly to move the wheels H through the recesses 34 that are in alignment with the wheels. It is now a simple matter to move the dolly for freeing the other wheels H from the rail E and lift the dolly above the table. Another dolly can be substituted for the removed one if desired.

Certain of the dollies B, support table wiping squeegees. I have found that every fourth dolly can be thus provided but I do not wish to be confined to any particular number. In FIGS. 6, 11, 12 and 13, I show in detail how the squeegee or wiper R is connected to the dolly or carrier B. It extends transversely across the table from the inner wall 2 to the outer wall 3. Note that the lower edge 34 contacts with the upper surface of the table A, and the ends 35 and 36 contact with the table side walls 2 and 3, respectively. The squeegee or wiper R has rounded corners for conforming to the rounded corners that connect the sidewalls 2 and 3 with the horizontal portion of the table. The end portions of the table wiper R extend under the dolly-supporting rails D, and E, as shown in FIG. 12, while the central portion 37 is made higher and is received in an inverted U-shaped frame S, see also FIG. 6. Bolts 38 secure the central body 37 of the wiper R to the frame S.

The means for securing the wiper frame S to the dolly B permits the frame and wiper to shift laterally and to move vertically within predetermined limits so that the wiper can follow any irregularities on the surface of the table or on its sidewalls. FIGS. 12 and 13 show the frame S provided with vertically extending sleeves T, that have oval-shaped openings therein. Vertically extending guide bolts 39 project through the sleeves T and have their upper ends threaded into sockets 40 that have their upper ends welded to the rear portion 7 and the front portion 10 of the dolly or carrier B, as shown in FIG. 12. The oval-shaped sleeves T permit lateral movement of the bolts 39 in the sleeves. The frame S, and wiper R can move vertically on the bolts. The heads of the bolts 39 are disposed below the bottoms of the frame S and sleeves T and therefore the lower edge 34 of the wiper can be dragged over the upper surface of the table for cleaning it. The table A will have an opening, not shown, through which any material will pass that has dropped upon the table and conveyed by the wiper R to the opening.

I claim:

1. In combination:
   a. a plurality of spaced apart dish-carrying dollies;
   b. a link carried by each dolly and having its length extending in the direction of travel by the dollies, the ends of said link being flattened with the flattened portions lying in a horizontal plane;
   c. intermediate links having flattened ends, an intermediate link being disposed between adjacent dollies and having its flattened ends resting on top of both the flattened ends of the links carried by the adjacent dollies;
   d. means for pivotally connecting the abutting ends of adjacent links; and
   e. one of said intermediate links having means for making it adjustable as to its effective length, said dollies being arranged in an endless train.

2. In combination:
   a. a table having two sidewalls;
   b. a rail supported by each side wall;
   c. a dish-carrying dolly movable along and supported by the rails;
   d. a table wiping squeegee extending transversely across the table from one sidewall to the other and having its ends disposed below said rails;
   e. a frame connected to said squeegee and having a pair of spaced apart and vertical sleeves oval shaped in cross section; and
   f. vertical guide members connected to said dolly and being slidably received in said sleeves, said sleeves permitting any lateral adjustment and vertical movement of said squeegee with respect to said dolly as said dolly moves the squeegee along the table during the movement of the dolly along the rails; whereby the table is cleaned of any foreign matter.

3. In combination with a dishwasher:
   a. an oval table having a portion extending through the dishwasher and having an endless track thereon;
   b. an endless train of dish-carrying dollies having wheels receivable in the endless track for supporting and guiding the dollies;
   c. a link carried by each dolly and having its length extending in the same direction as the dolly travel;
   d. intermediate links disposed between adjacent dollies and being pivotally connected to the links carried by the dollies;
   e. one of the intermediate links having means for making it adjustable as to its effective length so that the overall length of the train of dish-carrying dollies will be the same as the overall length of the track that supports and guides the dollies; and
   f. means for moving the train of dollies along the oval table and through the dishwasher.